March 2, 1954  J. L. HISS  2,670,763
MEANS FOR FASTENING SHEETS OF INSULATION ON DUCTS
Filed June 21, 1949  3 Sheets-Sheet 1
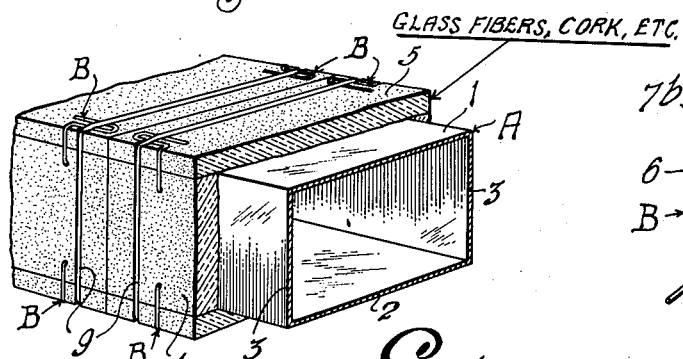
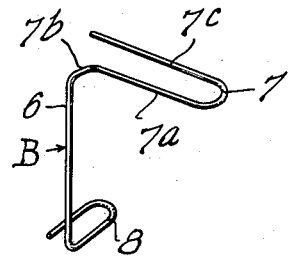
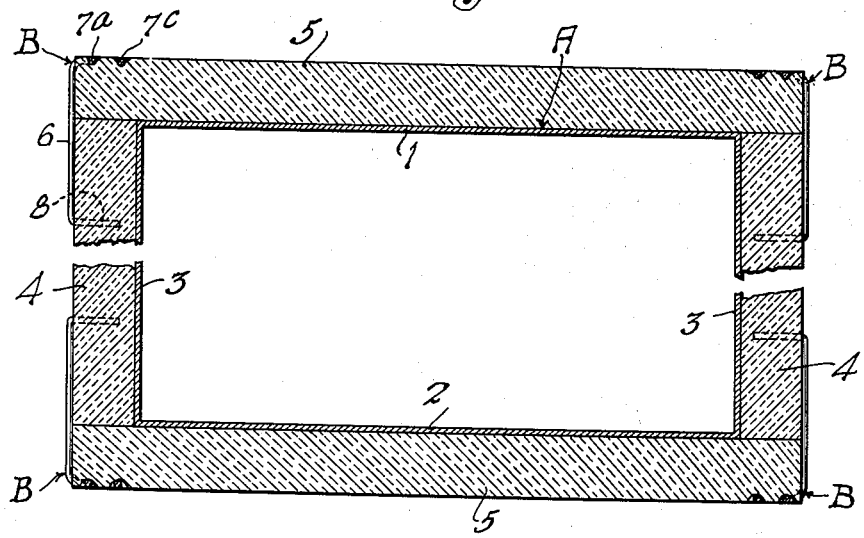
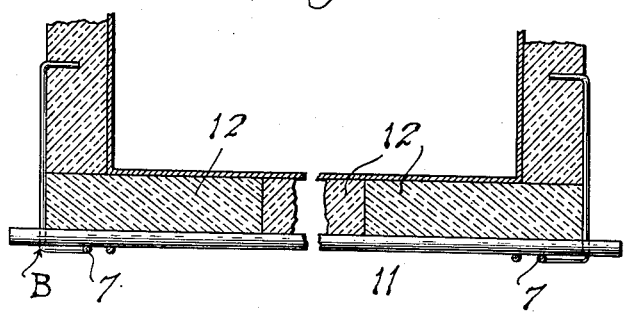
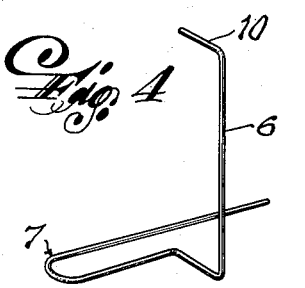
INVENTOR.
JAMES L. HISS,
BY
ATTORNEY

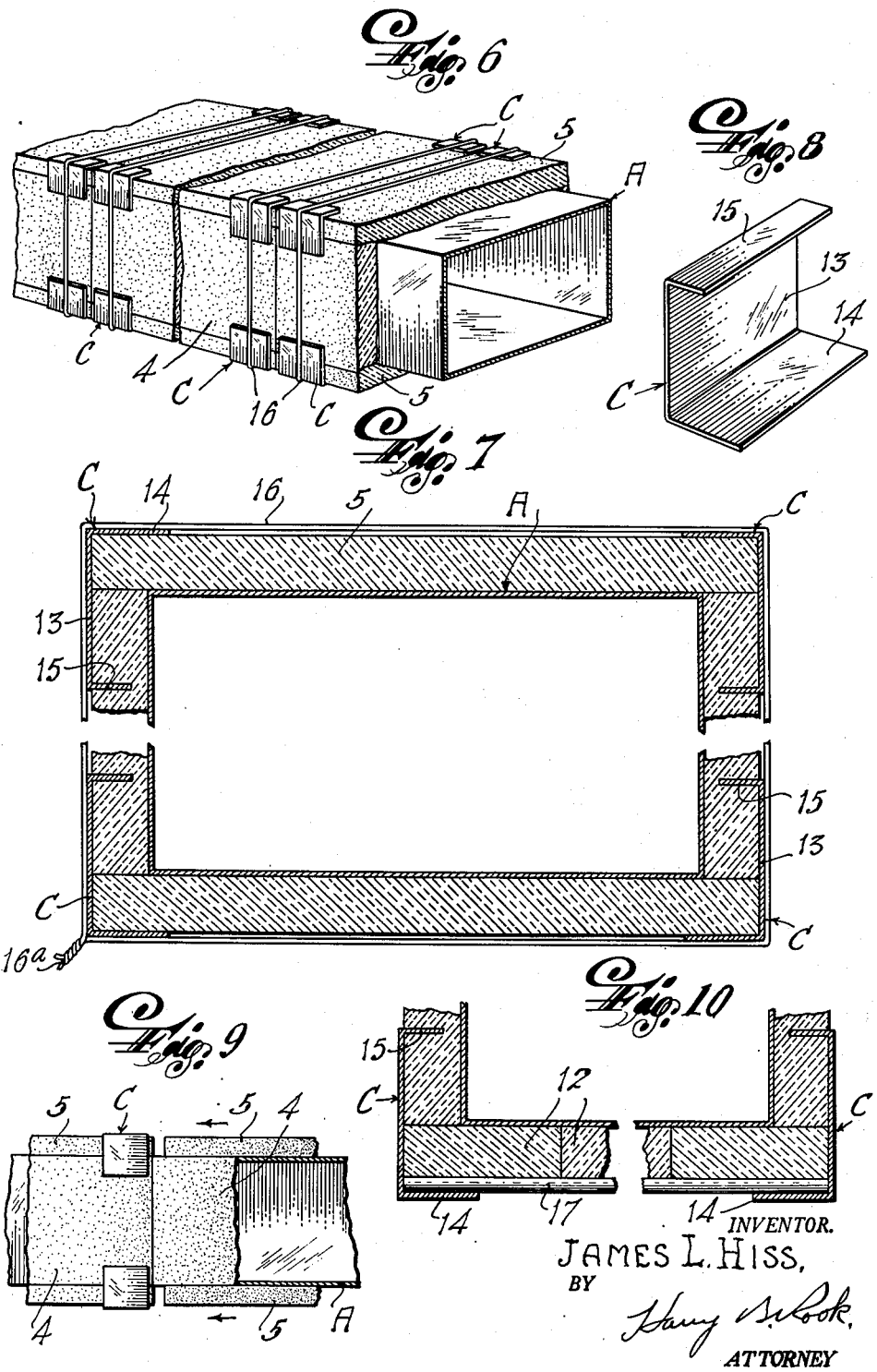

March 2, 1954 J. L. HISS 2,670,763
MEANS FOR FASTENING SHEETS OF INSULATION ON DUCTS
Filed June 21, 1949 3 Sheets-Sheet 3
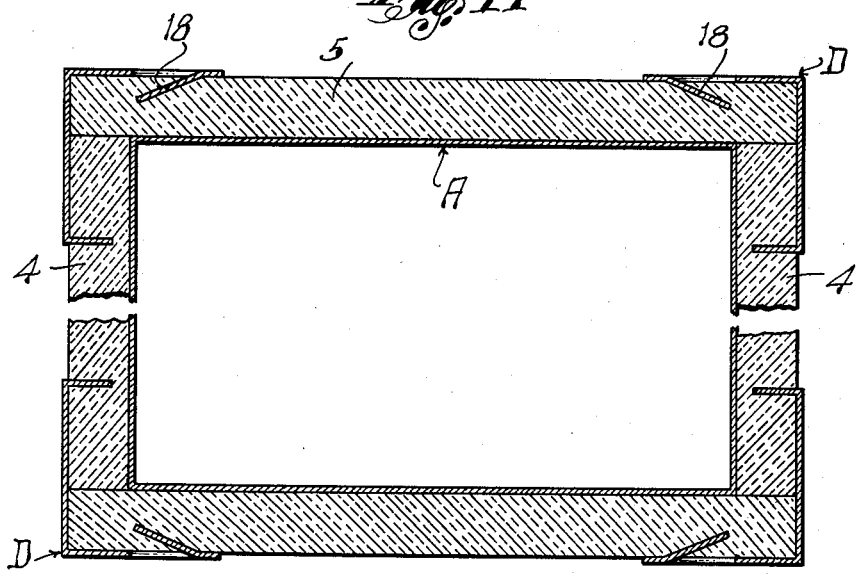
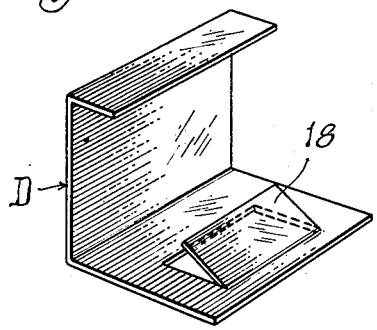
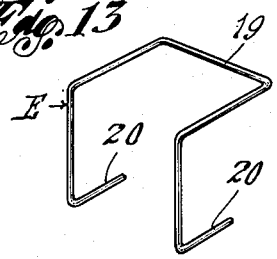
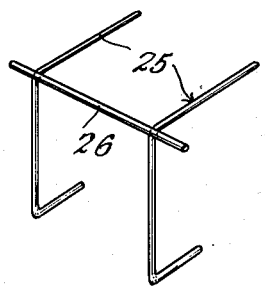
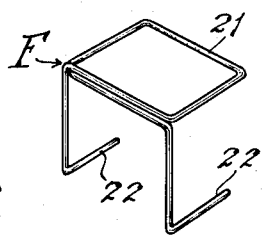
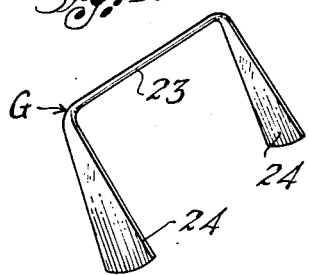
INVENTOR.
JAMES L. HISS,
BY
ATTORNEY Patented Mar. 2, 1954

2,670,763

UNITED STATES PATENT OFFICE 2,670,763

MEANS FOR FASTENING SHEETS OF INSULATION ON DUCTS

James L. Hiss, Mountain Lakes, N. J.

Application June 21, 1949, Serial No. 100,428

2 Claims. (Cl. 138—64)

This invention relates particularly to the application of relatively thick sheets or blocks of heat insulation material, such as glass fiber and cork, to ducts that are rectangular in cross-section.

According to one known method, sheets of insulation are cemented on the sides of the ducts with the edge portions of the sheets on one side overlapping and abutting the edges of the sheets on adjacent sides. Sheet metal angle corner pieces are cemented on all four of the corners of the insulation covering, and soft iron banding wire is looped around the duct over the corner pieces, drawn tight and fastened as by twisting the ends of the wire with pliers. Usually the joints between the sheets of insulation on the same sides of the duct are caulked or closed, for example, by industrial adhesive tape.

Another similar method is also used but includes the step of cementing pin-like fasteners on the sides of the duct and then impaling the sheets of insulation on said pin-like fasteners instead of cementing the sheets of insulation directly to the duct.

The known methods are expensive, particularly as to labor, and it is impossible to make tight butt joints between the insulation sheets on the same sides of the ducts without caulking.

Therefore, prime objects of my invention are to provide a novel and improved method of and a novel clip for applying heat insulation material to ducts of the general character described, whereby the insulation can be fastened on ducts rapidly and at relatively low cost; and to provide such a method and clip whereby sheets of fibrous insulation, such as glass fibers, can be applied with tight butt joints between the sheets which shall require no caulking or cementing.

Another object is to provide a novel and improved clip of the nature referred to whereby insulation sheets can be easily and quickly applied to a duct with a minimum of labor.

Other objects, advantages and results of the invention will be brought out by the following description in conjunction with the accompanying drawing, in which:

Figure 1 is a fragmentary sectional perspective view of a duct having insulation applied thereto according to my method and with my clips;

Figure 2 is a greatly enlarged transverse vertical sectional view through the duct, with portions broken away and with the banding wires omitted for clearness in illustration;

Figure 3 is a detached perspective view of one of the clips embodying the invention;

Figure 4 is a similar view showing a modification of the clip;

Figure 5 is a fragmentary view similar to Figure 2, showing another application of the invention;

Figure 6 is a view similar to Figure 1, showing another form of the clip;

Figure 7 is a view similar to Figure 2 but including the banding wire;

Figure 8 is a perspective view of one of the clips shown in Figures 6 and 7;

Figure 9 is a combination composite side elevational and longitudinal sectional view illustrating the manner of forming the butt joints between the sheets of insulation;

Figure 10 is a view similar to Figure 5, showing a modification in the use of the clips shown in Figures 6 and 7;

Figure 11 is a view similar to Figure 2, showing another form of clip;

Figure 12 is a detached perspective view of the clip illustrated in Figure 11, and Figures 13, 14, 15 and 16 are perspective views of other modifications of the clip.

Specifically describing the embodiment of the invention illustrated in Figures 1-3, inclusive, the reference character A designates a metallic duct that is rectangular in cross-section and is commonly found in air conditioning systems, the duct having top, bottom and side walls 1, 2 and 3, respectively.

In applying to such ducts heat insulation material, such as sheets of glass fibers, cork, or similar heat insulation, rectangular sheets 4 of the material are provided of a width approximately equal to the width of each of two opposed walls, for example, the side walls 3, and other sheets 5 are provided of a width equal to the width of each of the other opposed walls, for example, the top or bottom walls 1 or 2 plus twice the thickness of the sheets. Preferably, all of the sheets are of the same length which may be as desired. These sheets are then applied to the duct with the edge portions of the wider sheets overlying and abutting the narrower edges of the sheets 4, as best shown in Figures 1 and 2, after which clips embodying my invention are applied to the corners of the insulation covering. Where the insulation material is fibrous, for example, "Fiberglas," a clip like that shown in Figure 3 may be utilized. This clip B is formed of a single length of wire bent approximately into U-shape to form a main shank portion 6 and head and foot portions 7 and 8, respectively, projecting laterally from the shank in the same direction and disposed in planes aproximately perpendicular to the shank. The head portion of the shank also extends beyond the shank in a direction perpendicular to the first-mentioned direction. As shown, the head is looped with one limb 7a connected to a neck 7b by which the head is offset in one direction from the shank, and the two limbs 7a and 7c of the head are disposed in a common plane that is approximately perpendicular to the shank. The foot 8 is similarly looped and extends laterally from the shank in the same direction as and in a plane substantially parallel to the plane of the head 7. The length of the shank is substantially greater than the thickness of the sheets 4 and 5 so that the foot 8 of a clip may be pressed into one of the narrower sheets 4 with the shank abutting the outer surface of said sheet and the adjacent edge of the adjoining sheet 5 and with the head 7 lying snugly on the outer surface of said sheet 5, as shown in Figures 1 and 2. The clips are preferably applied to the sheets adjacent their ends and serve to temporarily hold the sheets in proper relation to the duct. Other sheets may then be applied to the duct in endwise abutting relation to the first applied sheets until the duct has been covered, and it will be noted that the sheets are free to slide on the walls of the ducts so that each sheet may be pressed into firm edgewise contact with an adjacent sheet to form a tight butt joint between the sheets, as illustrated in Figure 9, where the sliding of two of the sheets into contact with adjacent sheets is indicated by the arrow.

After the sheets have been applied to the duct, banding wires 9 are looped around the duct over the heads 7 of the clips which serve as bearing pieces for the wires, after which the wires are drawn tight and their ends are fastened together as by twisting them with pliers, as shown in Figures 1, 6 and 7.

The foot 8 shown in Figure 3 is particularly adaptable for use with "Fiberglas" insulation in that the round end of the U-shaped loop can be easily pressed into the "Fiberglas" and at the same time provide a substantial area of contact therewith so that the foot cannot be easily torn through the "Fiberglas." However, where cork or similar dense material is utilized, the foot may be pin-like, as indicated at 10 in Figure 4, so that it can easily penetrate the material and yet obtain adequate hold therein.

In some cases the walls of the duct are so large that two or more sheets of the insulation material are required to cover such walls, and when this condition obtains, it is customary to use so-called pencil bars 11 spanning the several sheets transversely of the duct wall, as shown in Figure 5. With my clips, it is easy to place the ends of the pencil bars between the heads 7 of the clips and the outer surfaces of the sheets 12 of insulation and no special care need to be given to the length of the pencil bars because they may project freely beyond the clips at the corners of the ducts.

A modification of the clip is shown in Figures 6-8, inclusive, and comprises a sheet metal channel C having a base portion 13 corresponding to the shank 6 of the wire clip, and flanges 14 and 15 corresponding respectively to the head 7 and foot 8 of the wire clip B.

This form of clip is used in the same manner as described in connection with the wire clip B, the foot flange 15 being pressed into one of the narrower sheets 4 so that the base or shank portion 13 will abut said narrower sheet and the adjacent edge of the adjoining wider sheet 5 and the head flange 14 will snugly rest on the outer surface of the wider sheet 5, as shown in Figures 6 and 7. Banding wires 16 identical with the wires 9 are looped around the duct in overlying relation to the clip C. If desired, notches may be filed in the edges or corners of the clips to prevent slipping of the banding wires, and in this connection, attention is invited to the fact that with the wire clips B the banding wires are permitted to become partially embedded in the insulation sheets, particularly at the corners, so that slipping of the banding wires is prevented.

Pencil bars may be used with the clips C as shown in Figure 10 where a pencil bar 17 has its ends interposed between the head flanges 14 of the clips and the sheets of insulation 12.

If desired, the clip C may be formed with a prong or lug to reduce the possibility of the clip accidentally sliding off the insulation, and as shown in Figure 12, the clip D has a prong or lug 18 projecting inwardly therefrom so as to bite into the insulation material, as shown in Figure 11.

It will be understood by those skilled in the art that various other shapes or configurations may be adopted for the clips, and Figures 13–16, inclusive, show several different forms of wire clips. In Figures 13, 14 and 15 the clips are formed of single pieces of wire, the clip E of Figure 13 having a head portion 19 and two feet 20, the clip F of Figure 14 having a head portion 21 and two feet 22, and the clip G of Figure 15 comprising a single shank portion 23 whose ends are bent at right angles to the shank and flattened to form two identical end portions 24 either of which may be the head while the other may be the foot.

In Figure 16, three pieces of wire are used, there being two U-shaped pieces 25, the corresponding arms of which form respectively the head and foot portions of the clip, the two pieces being rigidly connected together by a tie bar 26 which serves as the bearing for the banding wire.

While I have shown the now preferred embodiments of my invention, it should be understood that this is primarily for the purpose of illustrating the principles of the invention and that the construction of the clips may be widely modified and the steps and the method may be changed within the spirit and scope of the invention.

Having thus described the invention, what I claim is:

1. The combination with a duct of rectangular cross-section, of a sheet of insulation material on each of the four walls of the duct, each of some of said sheets having at least one edge in a common plane with one of said walls at one corner of the duct and each of some of said sheets having an edge portion overlying and abutting said edges of the first-mentioned sheets, and a U-shaped clip at each corner of the duct having a shank and two arms projecting laterally therefrom in the same direction, one arm in abutting contact with said edge portion of one sheet and the other arm penetrating adjacent the edge thereof the sheet on an adjacent wall, the shank of said clip spanning the joint between the adjoining sheets, and a banding wire drawn tightly around the duct and bearing upon the first-mentioned arms of said U-shaped clips.

2. The combination with a duct of rectangular cross-section, of a sheet of insulation material on each of the four walls of the duct, each of some of said sheets having at least one edge in a common plane with one of said walls at one corner of the duct and each of some of said sheets having an edge portion overlying and abutting said edges of the first-mentioned sheets, and a clip at each corner of the duct and formed of a single piece of wire and comprising a shank having a head and a foot projecting laterally from the shank in the same direction and spaced apart a distance substantially greater than the thickness of one of said sheets of insulation material, said foot penetrating the second-mentioned sheet adjacent said edge with said shank of the clip spanning the joint between said sheets, said head comprising a loop in said piece of wire extending beyond the shank in a direction perpendicular to the first-mentioned direction and disposed in abutting contact with said edge portion of the second-mentioned sheet, and a banding wire drawn tightly around the duct and bearing upon said loops of said clips.

JAMES L. HISS.

References Cited in the file of this patent

UNITED STATES PATENTS

| Number | Name | Date |
|---|---|---|
| 195,866 | Winne | Oct. 2, 1877 |
| 218,340 | Toope | Aug. 5, 1879 |
| 344,691 | Thomas | June 29, 1886 |
| 443,710 | Donley | Dec. 30, 1890 |
| 524,878 | Worthington | Aug. 21, 1894 |
| 926,423 | Kelly | June 29, 1909 |
| 1,239,106 | Hutsel | Sept. 4, 1917 |
| 1,782,774 | Connery | Nov. 25, 1930 |
| 2,110,734 | Leslie | Mar. 8, 1938 |
| 2,338,801 | Callan | Jan. 11, 1944 |
| 2,396,826 | Callan | Mar. 19, 1946 |

FOREIGN PATENTS

| Number | Country | Date |
|---|---|---|
| 572,493 | Great Britain | Oct. 10, 1945 |